(12) United States Patent
Shin et al.

(10) Patent No.: US 11,457,781 B2
(45) Date of Patent: Oct. 4, 2022

(54) NOZZLE FOR CLEANER

(71) Applicant: LG Electronics Inc., Seoul (KR)

(72) Inventors: Jinhyouk Shin, Seoul (KR); Ingyu Yang, Seoul (KR); Jungwan Ryu, Seoul (KR); Namil Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 603 days.

(21) Appl. No.: 16/316,225

(22) PCT Filed: Dec. 22, 2017

(86) PCT No.: PCT/KR2017/015412
§ 371 (c)(1),
(2) Date: Jan. 8, 2019

(87) PCT Pub. No.: WO2018/117768
PCT Pub. Date: Jun. 28, 2018

(65) Prior Publication Data
US 2020/0221913 A1 Jul. 16, 2020

(30) Foreign Application Priority Data
Dec. 23, 2016 (KR) .................. 10-2016-0177704

(51) Int. Cl.
*H02K 5/20* (2006.01)
*H02K 11/33* (2016.01)
(Continued)

(52) U.S. Cl.
CPC .................. *A47L 9/04* (2013.01); *A47L 9/22* (2013.01); *A47L 9/28* (2013.01); *H02K 5/10* (2013.01);
(Continued)

(58) Field of Classification Search
CPC ... A47L 9/04; A47L 9/28; A47L 11/14; H02K 11/33; H02K 5/20; H02K 7/003;
(Continued)

(56) References Cited

U.S. PATENT DOCUMENTS 6,011,331 A * 1/2000 Gierer ................... H02K 5/207
310/58
8,393,052 B2 3/2013 Blocker et al.
(Continued)

FOREIGN PATENT DOCUMENTS

CN 102158118 8/2011
CN 103239186 8/2013
(Continued)

OTHER PUBLICATIONS

Machine Translation of KR-2015141796-A (Year: 2015).*
(Continued)

*Primary Examiner* — Quyen P Leung
*Assistant Examiner* — Christopher S Leone
(74) *Attorney, Agent, or Firm* — Fish & Richardson P.C.

(57) ABSTRACT

A nozzle of a cleaner includes: a housing; a rotation cleaning unit accommodated in the housing and configured to clean a surface based on a rotation operation; and a drive unit inserted into a side of the rotation cleaning unit. The drive unit includes a motor, a motor supporter fixed to the housing and coupled to the motor, a gear unit connected with a rotation shaft of the motor to transfer a driving force, and a shaft connected to the gear unit and the rotation cleaning unit to transfer a rotation force to the rotation cleaning unit. The motor includes a printed circuit board (PCB) installation portion in which a PCB is installed and which is spaced apart from the motor supporter, in which a first space portion in which the air flows is formed between the motor supporter and the PCB installation portion.

16 Claims, 11 Drawing Sheets

(51) Int. Cl.
*A47L 9/04* (2006.01)
*A47L 9/22* (2006.01)
*A47L 9/28* (2006.01)
*H02K 5/10* (2006.01)
*H02K 7/00* (2006.01)
*H02K 7/08* (2006.01)
*H02K 7/116* (2006.01)

(52) U.S. Cl.
CPC ............... *H02K 5/20* (2013.01); *H02K 7/003* (2013.01); *H02K 7/08* (2013.01); *H02K 7/116* (2013.01); *H02K 11/33* (2016.01); *H02K 2211/03* (2013.01)

(58) Field of Classification Search
CPC .......... H02K 7/08; H02K 5/203; H02K 5/207; H02K 9/02; H02K 9/06
See application file for complete search history.

(56) References Cited

U.S. PATENT DOCUMENTS

| | | | |
|---|---|---|---|
| 8,776,310 | B2 | 7/2014 | Genn et al. |
| 8,898,858 | B2 | 12/2014 | Dyson et al. |
| 10,136,784 | B2 | 11/2018 | Love et al. |
| 2005/0166351 | A1* | 8/2005 | Cunningham ............ A47L 5/22 15/314 |
| 2005/0172447 | A1* | 8/2005 | Roney .................. A47L 9/0494 15/384 |
| 2013/0205539 | A1 | 8/2013 | Dyson et al. |
| 2013/0212832 | A1 | 8/2013 | Genn et al. |

FOREIGN PATENT DOCUMENTS

| | | | |
|---|---|---|---|
| CN | 103239187 | 8/2013 | |
| CN | 204061091 | 12/2014 | |
| CN | 205304502 | 6/2016 | |
| EP | 2466147 A1 * | 6/2012 | ........... F04D 29/102 |
| GB | 2499213 | 10/2016 | |
| JP | H11-042184 A | 2/1999 | |
| JP | H11042184 | 2/1999 | |
| JP | 2001204657 | 7/2001 | |
| JP | 2002-272654 A | 9/2002 | |
| KR | 10-2006-0084715 | 7/2006 | |
| KR | 10-2007-0032454 | 4/2007 | |
| KR | 100813542 | 3/2008 | |
| KR | 10-2014-0123091 | 10/2014 | |
| KR | 10-2015-0141796 | 12/2015 | |
| KR | 2015141796 A * | 12/2015 | |
| KR | 10-1662045 | 9/2016 | |
| WO | WO2016100878 | 6/2016 | |

OTHER PUBLICATIONS

Chinese Office Action in Chinese Application No. 201780014064.9, dated Mar. 17, 2020. 15 pages (with English translation).
Extended European Search Report in European Application No. 178827028, dated, Mar. 31, 2020, 3 pages.
Australian Office Action in Australian Application No. 2017382967, dated Jul. 3, 2019, 3 pages.

* cited by examiner

NOZZLE FOR CLEANER

CROSS-REFERENCE TO RELATED APPLICATIONS

This application is a National Stage application under 35 U.S.C. § 371 of International Application No. PCT/KR2017/015412, filed on Dec. 22, 2017, which claims the benefit of Korean Application No. 10-2016-0177704, filed on Dec. 23, 2016. The disclosures of the prior applications are incorporated by reference in their entirety.

TECHNICAL FIELD

The present invention relates to a nozzle of a cleaner.

BACKGROUND ART

Generally, a vacuum cleaner is a device which sucks dust-containing air using a suction force generated by a suction motor mounted inside a cleaner main body, and then filters dust from a dust separator. Such a vacuum cleaner includes a canister-type cleaner having a suction nozzle for auctioning dust separately from the main body thereof and connected by a connection device, an upright type cleaner in which the suction nozzle is rotatably connected to the main body, and a handy type cleaner which is used in a state where a user grasps the main body thereof by hand.

The suction nozzle of the vacuum cleaner of the related art is provided with an agitator, which is a rotating brush with a brush. The agitator can clean while scraping off dust in a floor surface or a carpet during the rotation of the agitator.

Korean Patent Laid-Open Publication No. 10-2014-0123091, which is the related art, discloses "Cleaner head for vacuum cleaner".

The cleaner head of the related art includes a brush bar provided in the chamber and a motor for driving the brush bar. The motor rotates the brush bar, and the brush bar strikes the surface to be cleaned during the rotation of the brush bar. Thus, the brush bar can be termed "a rotating sweeper". The motor is inserted into the brush bar.

Meanwhile, the cleaner head of the related art is in contact with and rubbed against the floor surface during cleaning, thereby generating static electricity. Such static electricity can be transferred to the brush bar and the motor accommodated therein, thereby damaging a printed circuit board (PCB) for controlling the motor.

In addition, since the cleaner head of the related art has a structure in which the motor is housed in the brush bar, there is a problem that heat dissipation of the motor is not properly performed.

DISCLOSURE

Technical Problem

An objective of the present invention is to provide a nozzle of a cleaner in which static electricity is prevented from reaching a PCB of a motor for driving a rotation cleaning unit.

Another objective of the present invention is to provide a nozzle of a cleaner which can effectively cool a drive unit for driving a rotation cleaning unit.

Another objective of the present invention is to provide a nozzle of a cleaner in which vibration generated in a drive unit for driving a rotation cleaning unit is reduced.

Technical Solution

According to an aspect of the present invention, there is provided a nozzle of a cleaner including: a rotation cleaning unit; and a drive unit, in which the drive unit includes a motor, and a motor supporter, in which a printed circuit board (PCB) installation portion in which a PCB is installed and which is spaced apart from the motor supporter is provided in the motor, and a first space portion in which air flows is provided between the motor supporter and the PCB installation portion.

In addition, a second space portion through which air flows may be formed between the motor supporter and the side cover.

In addition, at least a portion of the motor supporter may be separated from a main body portion of a housing so that the first space portion and the second, space portion communicate with each other.

In addition, the motor supporter may be provided with a first fastening hole for bolt-fastening the main body portion of the housing, the motor may be provided with a second fastening hole aligned with the first fastening hole, the gear unit may be provided with a third fastening hole aligned with the first and second fastening holes, and the nozzle of the cleaner may further include a fastening member fixed to the main body portion of the housing by passing through the first to build fastening holes at the same time.

Advantageous Effect

According to the present invention, a recessed portion is formed in the motor supporter on which a motor is mounted and the PCB and the motor supporter of the motor is spaced apart from each other so that static electricity generated in the nozzle of the vacuum cleaner can be naturally discharged without being transferred to the PCB of the motor. Accordingly, the PCB of the motor can be prevented from being damaged.

In addition, the nozzle of the cleaner of the present invention can provide a space portion between the motor supporter and the cover of the housing so that static electricity generated from the outside can be naturally discharged without being transferred to the motor supporter. Accordingly, the PCB of the motor can be prevented from being damaged.

In addition, the nozzle of the cleaner of the present invention may form a cooling flow path for cooling the drive unit by forming a space portion between the motor and the motor supporter and a space portion between the motor supporter and the cover of the housing.

In addition, the nozzle of the cleaner of the present invention can reduce the vibration generated in the drive unit such as the motor and the gear unit by fastening the motor supporter, the motor, and the gear unit integrally.

BEST MODE

Figure 1:
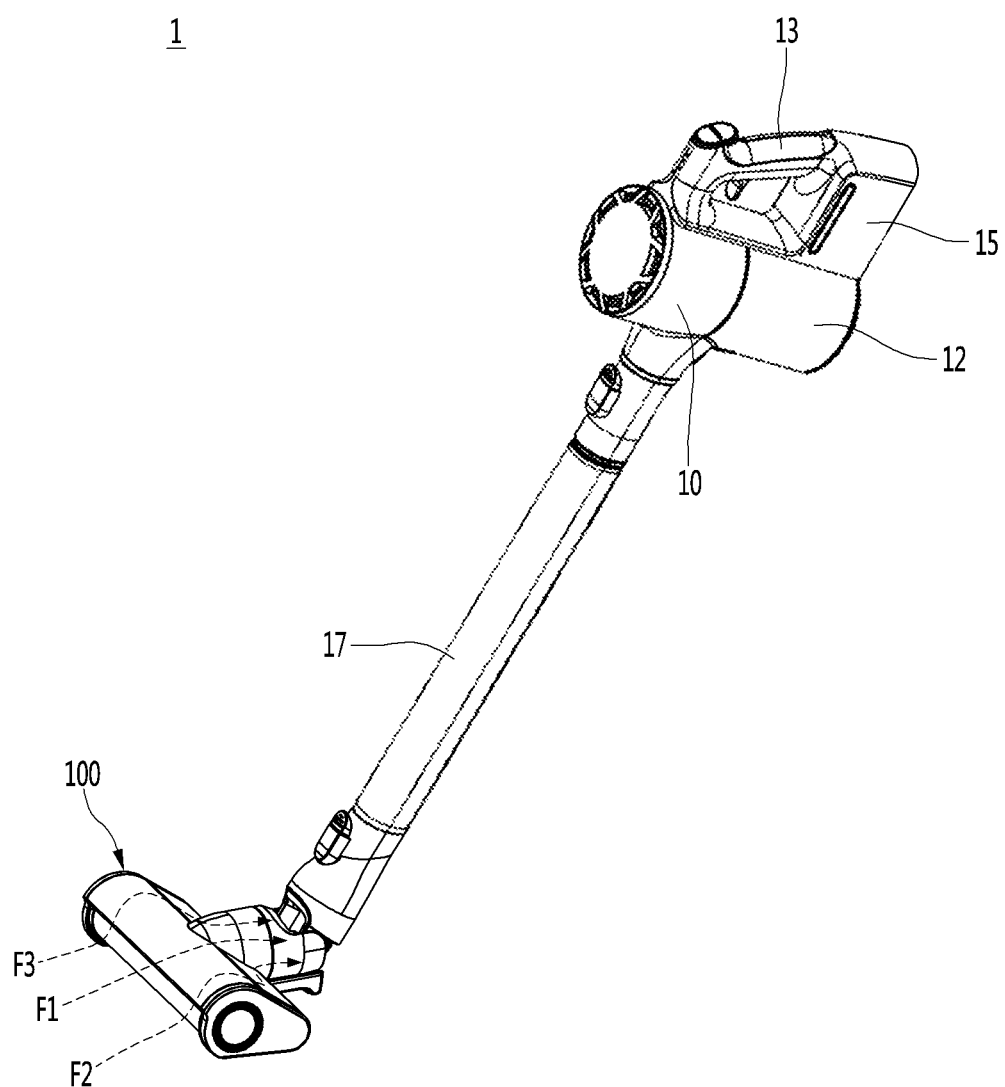
FIG. 1 is a perspective view of a vacuum cleaner according to an embodiment of the present invention.

Hereinafter, some embodiments of the present invention will be described specifically with reference to exemplary drawings. It is to be noted that, in adding reference numerals to the constituent elements of the drawings, the same constituent elements denoted by the same reference numerals whenever possible, even if the same constituent elements are illustrated in different drawings. In addition, in the following description of the embodiments of the present invention, a detailed description of known functions or configurations incorporated herein will be omitted in a case where it is determined that the detailed description thereof hinders understanding of the embodiment of the present invention.

In addition, in describing the constituent elements of the embodiment of the present invention, terms such as first, second, A, B, (a), and (b) may be used. These terms are intended to distinguish the constituent elements from other constituent elements, and the terms do not limit the nature, order or sequence of the constituent elements. In a case where a constituent element is described as being "connected", "coupled", or "accessed" to another constituent element, although the constituent element may be directly connected or accessed to the other constituent element, it should be understood that another constituent element may be "connected", "coupled", or "accessed" between the respective constituent elements.

FIG. 1 is a perspective view of a vacuum cleaner according to an embodiment of the present invention.

With reference to FIG. 1, a vacuum cleaner 1 according to an embodiment of the present invention includes a cleaner main body having suction motor (not illustrated) for generating a suction force, a suction nozzle 100 which sucks dust-containing air, and an extension pipe 17 which connects the cleaner main body 10 and the suction nozzle 100.

Meanwhile, although not illustrated, the suction nozzle 100 may be directly connected to the cleaner main body 10 without the extension pipe 17.

The cleaner main body 10 may include a dust container 12 for storing dust separated from the air. Accordingly, the dust introduced through the suction nozzle 100 can be stored in the dust container 12 through the extension pipe 17.

The cleaner main body 10 may be provided with a handle 13 for the user to grasp. The user can perform the cleaning while holding e grip 13.

The cleaner main body 10 is provided with a battery (not illustrated), and the cleaner main body 10 may be provided with battery accommodation portion 15 for accommodating the battery (not illustrated). The battery accommodation portion 15 may be provided lower portion of the handle 13. The battery (not illustrated) may be connected to the suction nozzle 100 to supply power to the suction nozzle 100.

Hereinafter, the suction nozzle 100 will be described in detail.

Figure 2:
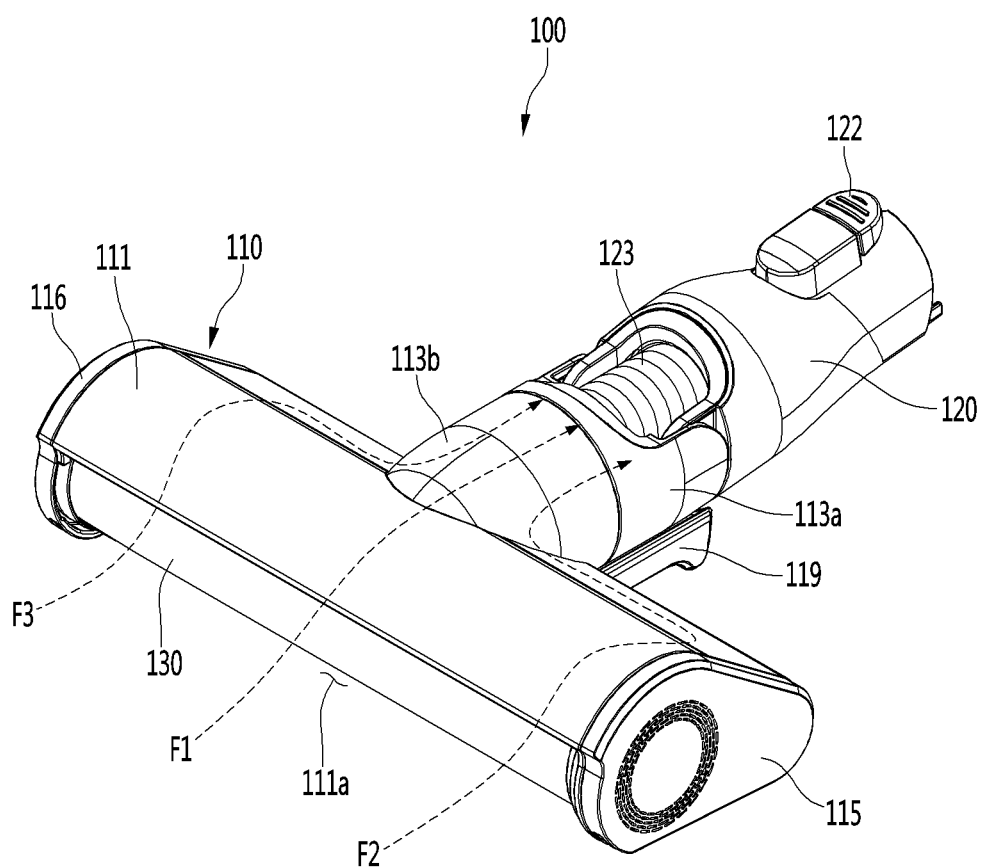
FIG. 2 is a perspective view of the suction nozzle of FIG. 1.
Figure 3:
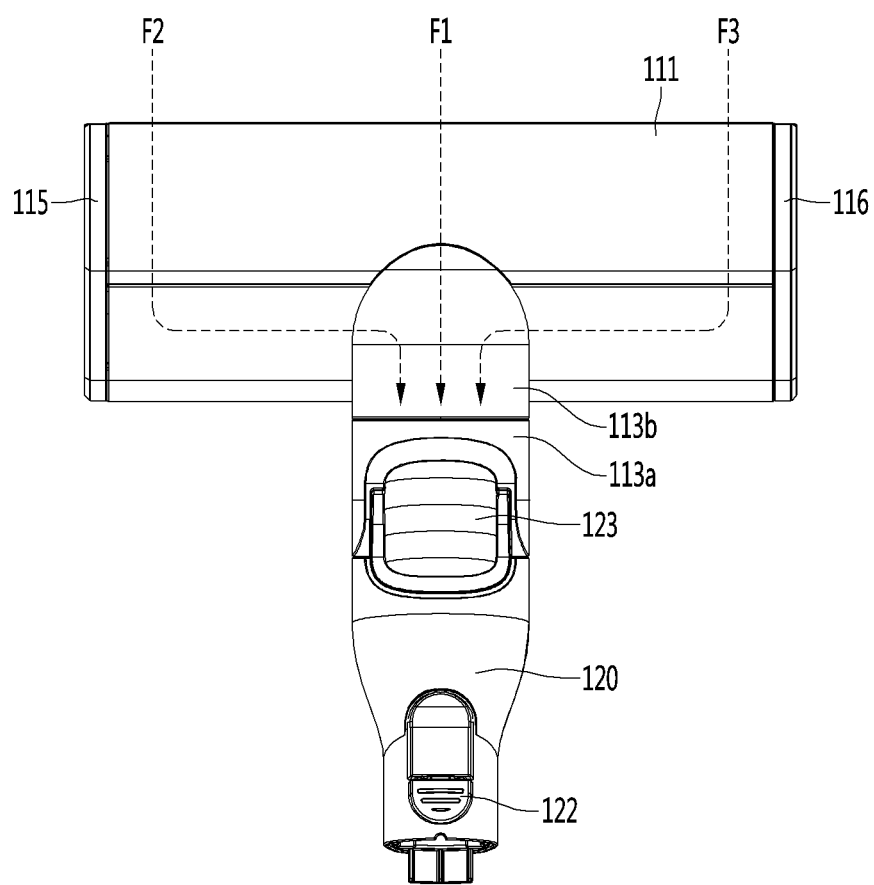
FIG. 3 is a plan view of the suction nozzle of FIG. 2.
Figure 4:
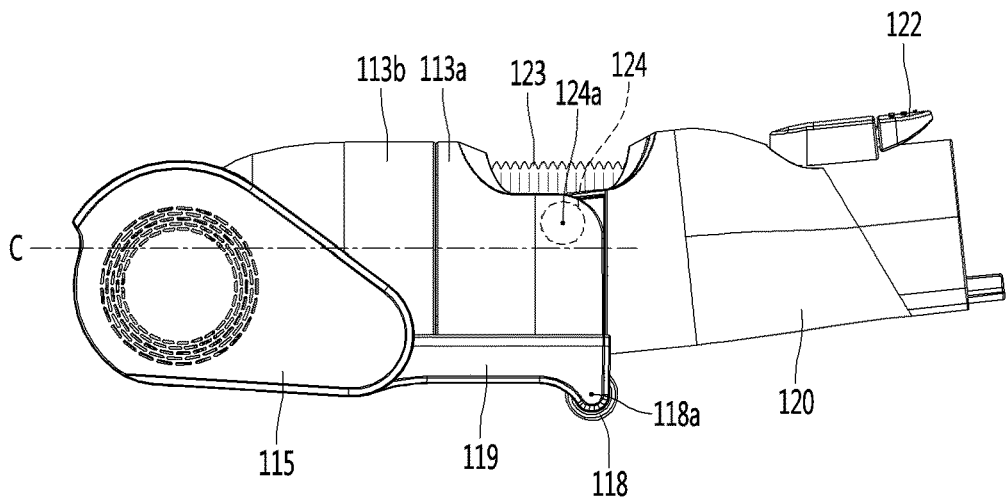
FIG. 4 is a side view of the suction nozzle of FIG. 1.
Figure 5:
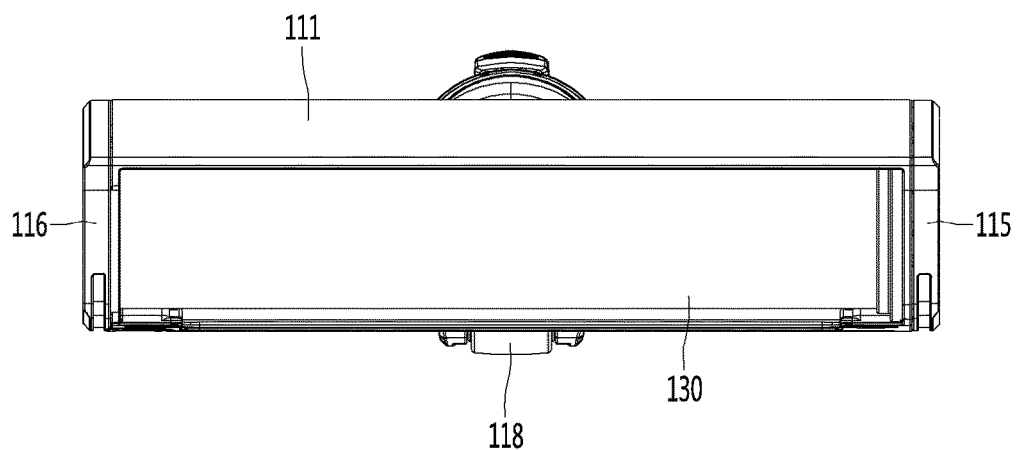
FIG. 5 is a front view of the suction nozzle of FIG. 1.
Figure 6:
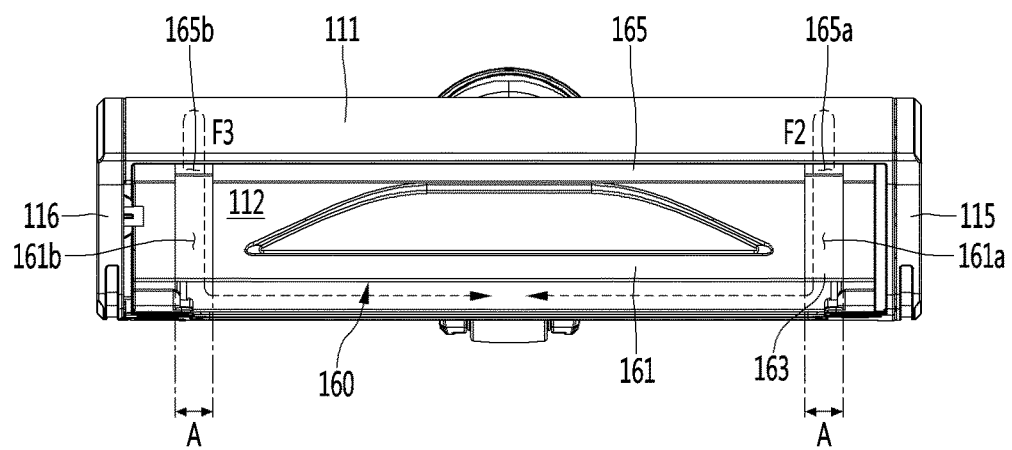
FIG. 6 is a view illustrating a state where rotation cleaning unit is removed from the suction nozzle of FIG. 5.
Figure 7:
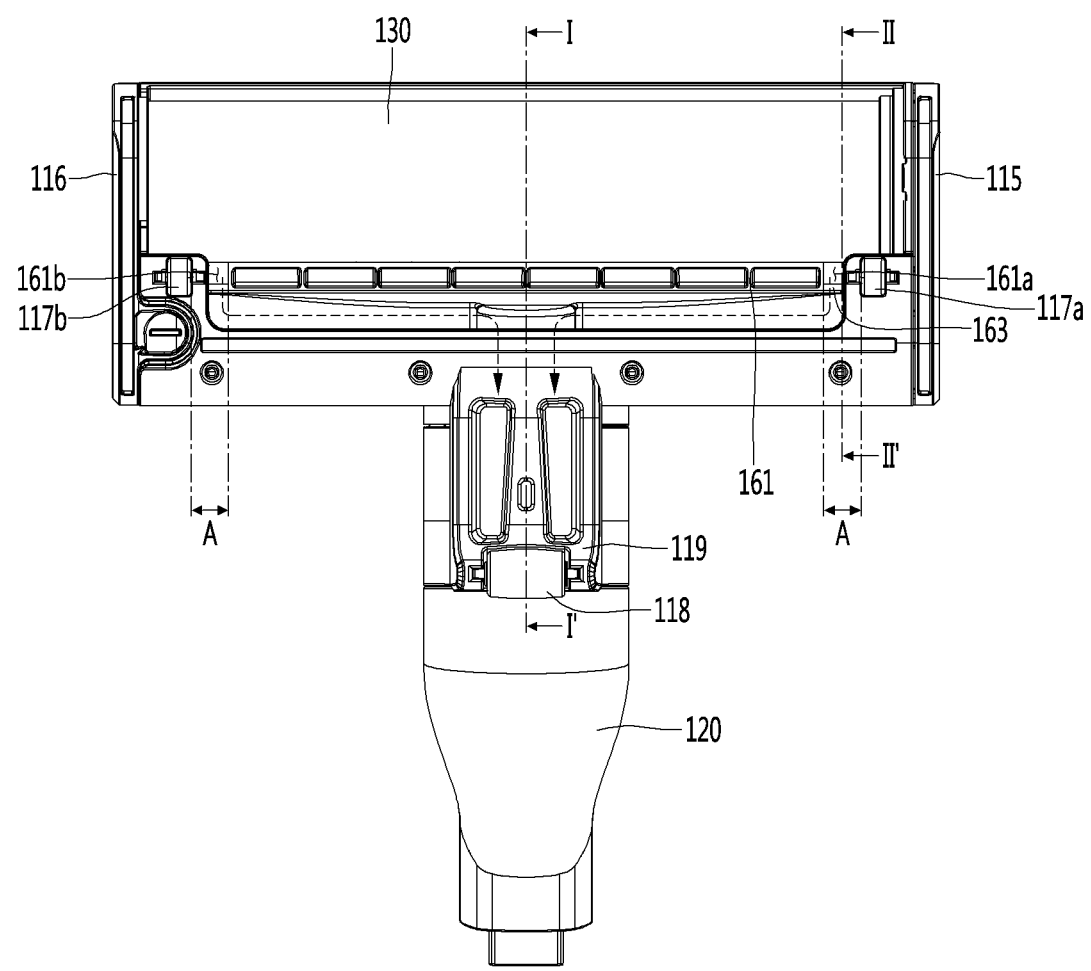
FIG. 7 is a bottom view of the suction nozzle of FIG. 1
Figure 8:
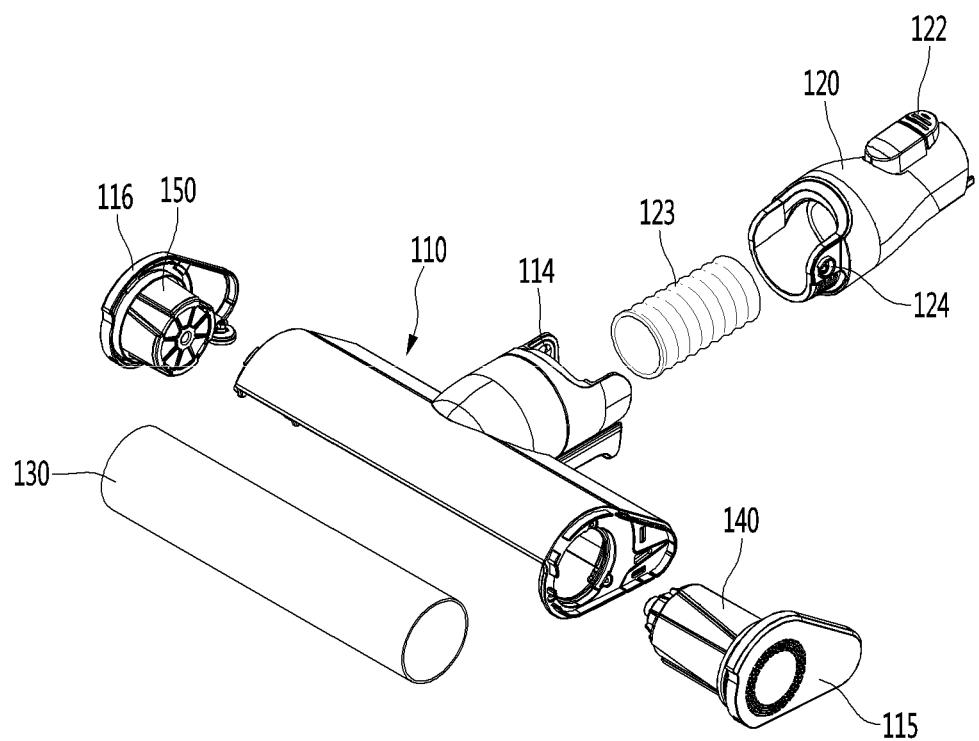
FIG. 8 is an exploded perspective view of the suction nozzle of FIG. 1.
Figure 9:
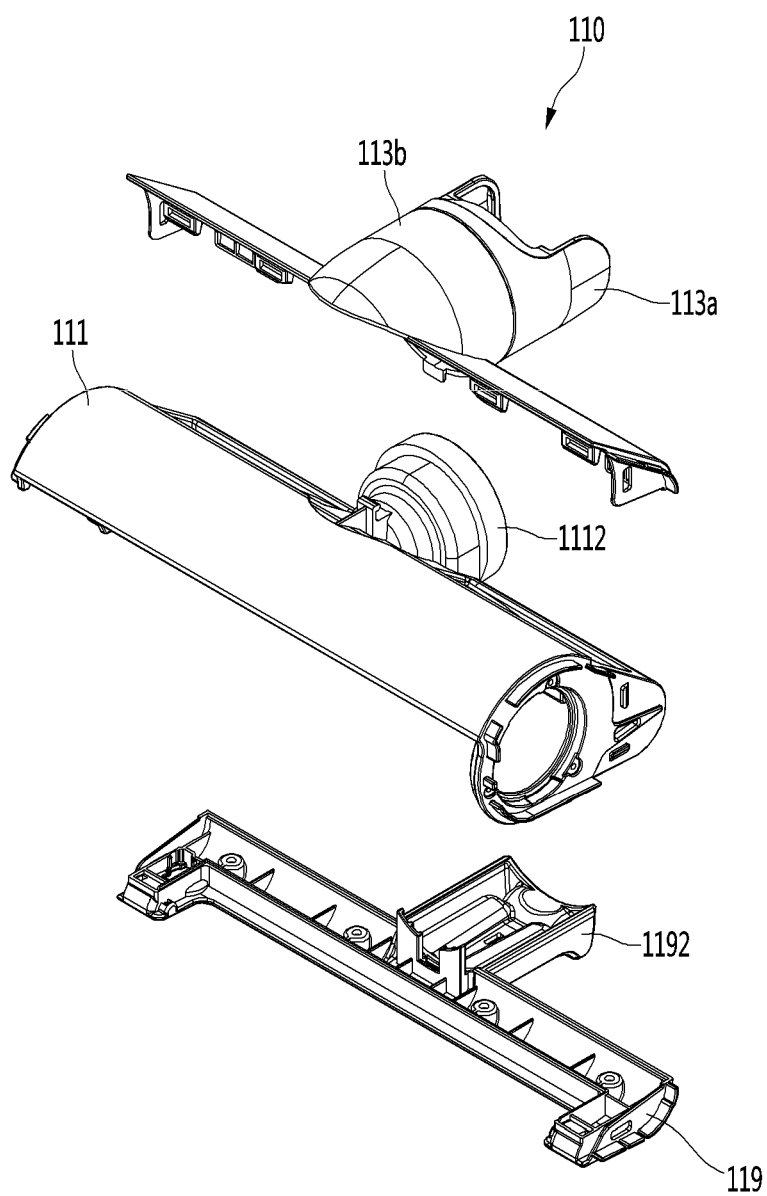
FIG. 9 is an exploded perspective view of the housing.
Figure 11:
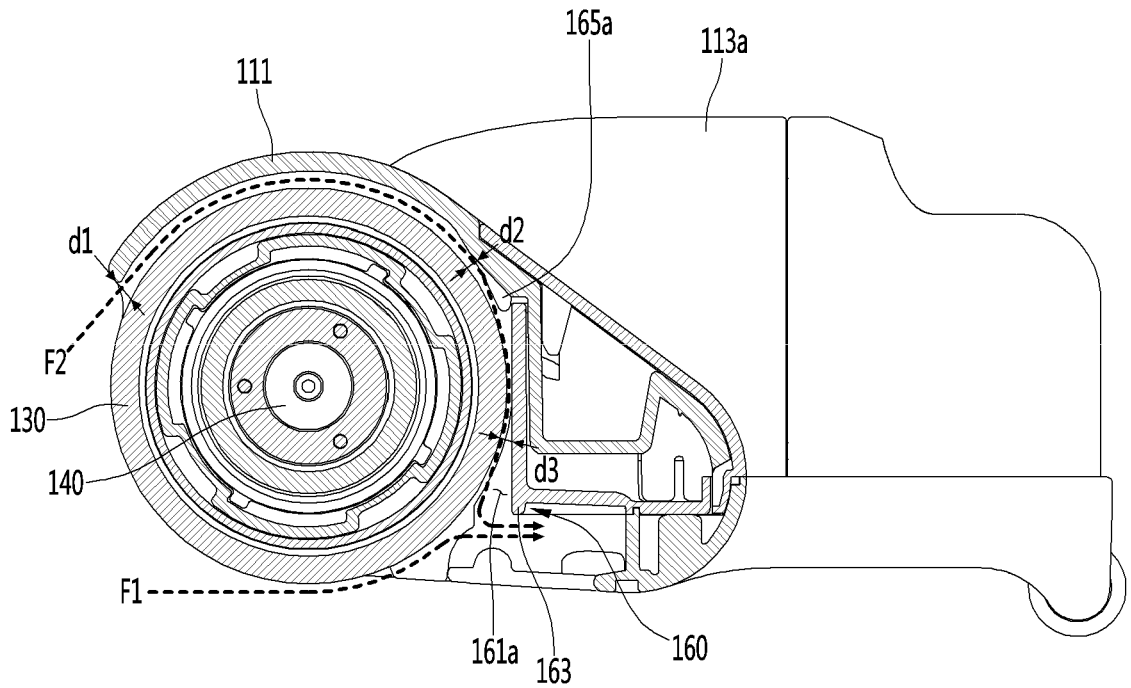
FIG. 11 is a cross-sectional view taken along line II-II' of FIG. 7

FIG. 2 is a perspective View of the suction nozzle of FIG. 1, FIG. 3 is a plan view of the suction nozzle of FIG. 2, FIG. 4 is a side view of the suction nozzle of FIG. 1, FIG. 5 is a front view of the suction nozzle of FIG. 1, FIG. 6 is a view illustrating, a state where a rotation cleaning unit is removed from the suction nozzle of FIG. 5, FIG. 7 is a bottom view of the suction nozzle of FIG. 1, FIG. 8 is an exploded perspective view of the suction nozzle of FIG. 1, FIG. 9 is an exploded perspective view of the suction nozzle, 10 is a cross-sectional view of the suction nozzle taken along line I-I' of FIG. 7, and FIG. 11 is a cross-sectional view taken along line II-II' of FIG. 7.

With reference to FIGS. 2 to 11, the suction nozzle 100 includes a housing 110, a connection pipe 120, and a rotation cleaning unit 130.

The housing 110 includes a main body portion 111 in which a chamber 112 is formed. The main body portion 111 may have a front opening 111a for sucking contaminant-containing air. The air introduced through the front opening 111a by the suction force generated in the cleaner main body 10 can be moved to the connection pipe 120 through the chamber 112.

The front opening 111a extends in the left and right direction of the housing 110 and extends to the front portion of the housing 110 as well as the bottom portion of the housing 110.

Accordingly, since a suction area can be sufficiently secured, it is possible to evenly clean from the floor surface to the portion adjacent to the wail surface.

The housing 110 may further include an inner pipe 112 communicating with the front opening 111a The suction force generated in the cleaner main body 10 allows external air to move to the inner flow path 1112a of the inner pipe 1112 through the front opening 111a.

The housing 110 may further include a drive unit. 140 for providing power for rotating the rotation cleaning unit 130. The drive unit 140 may be inserted into one side of the rotation cleaning unit 130 to transfer power to the rotation cleaning unit 130. The drive unit 140 will be described in detail with reference to FIG. 12.

The rotation cleaning unit 130 may be accommodated in the chamber 112 of the main body portion 111. At least a portion of the rotation cleaning unit 130 may be exposed to the outside through the front opening 111a. The rotation cleaning unit 130 is rotated by the driving force transferred through the drive unit 140 and rubs against the surface to be cleaned, thereby removing the contaminants. In addition, the outer circumferential surface of the rotation cleaning unit 130 may be made of a woven fabric such as a cotton flannel or a felt material. Accordingly, foreign matters such as dust accumulated on the surface to be cleaned during rotation of the rotation cleaning unit 130 can be effectively removed by being inserted into the outer circumferential surface of the rotation cleaning unit 130.

The main body portion 111 may cover at least a portion of the upper side of the rotation cleaning unit 130. The inner circumferential surface of the main body portion 111 may have a curved shape corresponding to the outer circumferential surface of the rotation cleaning unit 130. Accordingly, the main body portion 111 can perform a function preventing the foreign matters shaken from the surface to be cleaned from moving up due to the rotation of the rotation cleaning unit 130.

The housing 110 may further include side covers 115 and 116 covering both sides of the chamber 112. The side covers 115 and 116 may be provided on both sides of the rotation cleaning unit 130.

The side covers 115 and 116 include a first side cover 115 disposed at one side of the rotation cleaning unit 130 and a second side cover 116 disposed at the other side of the rotation cleaning unit 130. The drive unit 140 may be fixed to the first side cover 115.

The suction nozzle 100 further includes a rotation support portion 150 provided on the second side cover 116 to rotatably support the rotation cleaning unit 130. The rotation support portion 150 may be inserted into the other side of the rotation cleaning unit 130 to rotatably support the rotation cleaning unit 130.

Figure 10:
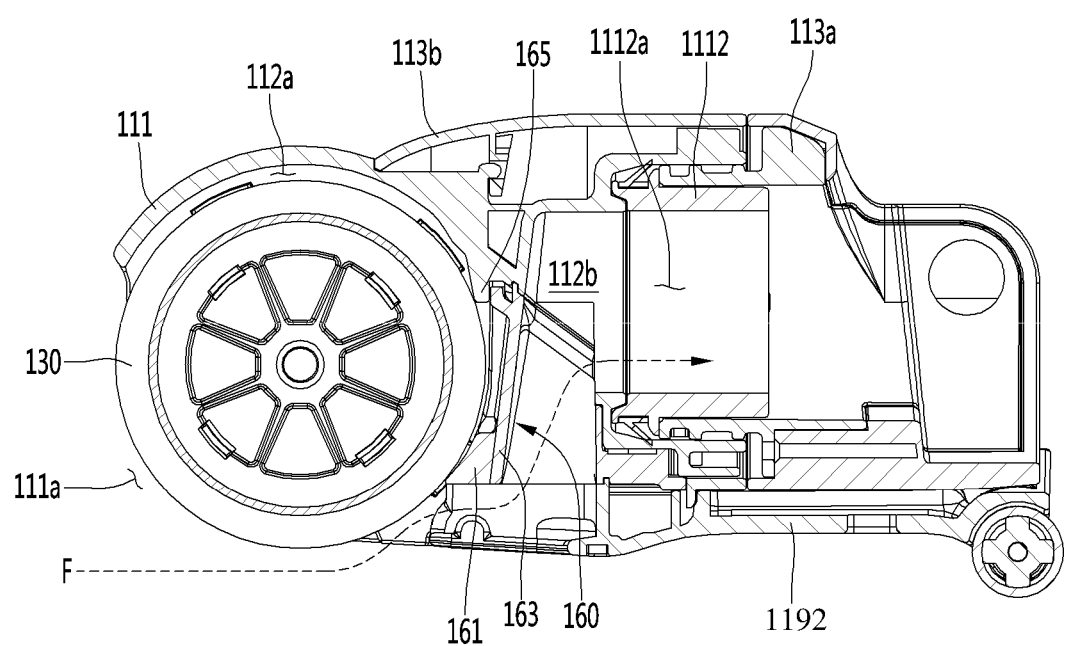
FIG. 10 is a sectional view of the suction nozzle cut along line I-I' in FIG. 7

The rotation cleaning unit 130 may rotate in a counterclockwise direction with reference to the sectional view of FIG. 10. In other words, the rotation cleaning unit 130 rotates so as to push toward the inner pipe 1112 at a contact point with the surface to be cleaned. Therefore, the foreign matters shaken from the surface to be cleaned by the rotation cleaning unit 130 is moved to a side of the inner pipe 1112 and sucked into the inner pipe 1112 by the suction force. Cleaning efficiency can be improved by rotating the rotation cleaning unit 130 backward with respect to the contact point with the surface to be cleaned.

The chamber 112 may be provided with a division member 160. The division member 160 may extend from the upper side to the lower side of the chamber of the housing 110.

The division member 160 may be provided between the rotation cleaning unit 130 and the inner pipe 1112. Accordingly, the partitioning member 160 can divide the chamber of the housing 110 into a first region 112a in which the rotation cleaning unit 130 is provided and a second region 112b in which the inner pipe 1112 is provided. As illustrated in FIG. 10, the first region 112a may be provided at a front portion of the chamber 112, and the second region 112b may be provided at a rear portion of the chamber 112.

The division member 160 may include a first extension wall 161. The first extension wall 161 may extend to be in contact with at least a portion of the rotation cleaning unit 130. Accordingly, when the rotation cleaning unit 130 rotates, the first extension wail 161 rubs against the rotation cleaning unit 130 to remove foreign matters adhering to the rotation cleaning unit 130.

In addition, the first extension wall 161 may extend along the rotation axis of the rotation cleaning unit 130. In other words, the contact point between the first extension wall 16 and the rotation cleaning unit 130 may be formed along the rotation axis direction of the rotation cleaning unit 130. Accordingly, the first extension wail 161 not only can remove the foreign matters adhering to the rotation cleaning unit 130 but also prevent the foreign matters on the surface to be cleaned from being introduced into the first area 112a of the chamber 112. Foreign matters are blocked from being introduced into the first region 112a of the chamber 112 and thus foreign matters are prevented from being discharged to the front of the housing 110 through the front opening 111a by the rotation of the rotation cleaning unit 130.

In addition, the first extension wall 161 blocks the hair or the thread attached to the rotation cleaning unit 130 from being introduced into the first area 112a of the chamber 112, and thus it is possible to prevent the hair or the thread from being wound around the rotation cleaning unit 130. In other words, the first extension wall 161 may perform an anti-tangle function.

The division member 160 may further include a second extension wall 165. The second extension wall 165 may extend to be in contact with at least a portion of the rotation cleaning unit 130, like the first extension wall 161. Accordingly, when the rotation cleaning unit 130 rotates, the second extension wall 165 rubs against the rotation cleaning unit 130 like the first extension wall 161 to remove the foreign matters attached to the rotation cleaning unit 130. Meanwhile, since the second extension wall 165 has the same function as the first extension wall 161 and only the first extension wall 161 without the second extension wall 161 can perform the function of removing foreign matters attached to the rotation cleaning unit 130, the second extension wall 165 may not be included in the configuration of the housing 110.

The second extension wall 165 may be disposed above the first extension wall 161. Accordingly, the second extension wall 165 has a function of secondarily separating foreign matters which are not separated by the first extension wall 161 from the rotation cleaning unit 130.

Hereinafter, the flow of air inside the housing 110 will be described.

A plurality of suction flow paths F1, F2, and F3 for moving the external air to the inner pipe of the main body portion 111 are formed in the main body portion 111 of the suction nozzle 100.

The plurality of suction flow paths F1, F2 and F3 include a lower flow path F1 formed on the lower side of the rotation cleaning unit 130 and upper flow paths F2 and F3 formed on the upper side of the rotation cleaning unit 130.

The lower flow path F1 is formed on the lower side of the rotation cleaning unit 130. Specifically, the lower flow path F1 connected from the front opening 111a via the lower side of the rotation cleaning unit 130 and the second region 112b to the inner flow path 1112a.

The upper flow paths F2 and F3 are formed on the upper side of the rotation cleaning unit 130. Specifically, the upper flow paths F2 and F3 may be connected to the inner flow path 1112a via the upper portion of the rotation cleaning unit 130 and the second region 112b in the first region 112a. Accordingly the Upper flow paths F2 and F3 may join the lower flow path F1 in the second region 112b.

The upper flow paths F2 and F3 include a first upper flow path F2 formed at one side of the housing 110 and a second upper flow path F3 formed at the other side of the housing 110. Specifically, the first upper flow path F2 is disposed adjacent to the first side cover 115, and the second upper flow path F3 is disposed adjacent to the second side cover 116.

A first lower groove portion 161a may be formed in the first extension wail 161 and a first upper groove 165a may be formed in the second extension wail 165, in order to form the first upper flow path F2.

The first lower groove portion 161a is formed by recessing an inner circumferential surface of the first extension wail 161, that is, portion of surface of the first extension wall 161 which abuts against the rotation cleaning unit 130. In addition, the first lower groove portion 161a may extend along the circumferential direction of the rotation cleaning unit 130.

The first upper groove portion 165a is formed by recessing an inner circumferential surface of the second extension wail 165, that a portion of a surface of the second extension wall 165 which abuts against the rotation cleaning unit 130. In addition, the first upper groove portion 165a may extend along the circumferential direction of the rotation cleaning unit 130.

The first lower groove portion 161a connected to the first upper groove portion 165a and the first upper flow path F2 is formed along the first lower groove portion 161a and the first upper groove portion 165a. Meanwhile, in a case where the suction nozzle 100 does not include the second extension wall 165, the first upper flow path F2 may be formed only by the first lower groove portion 161a.

In addition, the first lower groove portion 161a and the upper groove portion 165a may be formed to surround the drive unit 140. Accordingly, the first upper flow path F2 may be formed to surround at least a portion of the drive unit 140 along the periphery of the drive unit 140, and the drive unit 140 may be cooled due to the air flowing along the first upper flow path F2.

The width A of the first lower groove portion 161a and the first upper groove portion 165a in the left and right direction may be equal to each other as illustrated but is not limited thereto. The width A of the first lower groove portion 161a and the first upper groove portion 165a in the left and right direction may be a predetermined size. In a case where the width A in the left and right direction is small, the width of the first upper flow path F2 is narrowed, so that the flow amount of the air may small or the flow of air may be e blocked and the cooling performance of the drive unit 140 may be insignificant. On the contrary, in a case where the width A in the left-right direction is large, the flow amount of the air can be increased because the width of the first upper flow path F2 increases. However, The anti-tangle function of the hair or the like the rotation cleaning unit 130 by the first extension wall 161 and the second extension wall 165 may be degraded. Therefore, the width A in the left and right direction should be an appropriate size and may be formed to have a smaller width than the length of the drive unit. For example, the width A of the first upper groove portion 165a in the left and right direction may be 5 to 10 mm but is not limited thereto.

As illustrated in FIG. 11, the separation distance between the inner circumferential surface of the chamber 112 and the upper side portion of the rotation cleaning unit 130 in the first upper flow path F2 may become narrower toward the inner side of the chamber 112. Specifically, the separation distance between the inner circumferential surface of the chamber 112 and the upper side portion of the rotation cleaning unit 130 is d1 at a side of the on opening 111a, d2 at the first upper groove portion 165a, d3 in the first lower groove portion 161a, and has a smaller value from d1 to d3 (d1>d2>d3). For example, d1 may be 3 mm, d2 may be 2.7 mm, and d3 may be 2 mm. Due to such a feature, the flow velocity of the air can be reduced in the upper side of the rotation cleaning unit 130 toward the front opening 111a and the phenomenon that the foreign matters is discharged forward by the rotation of the rotation cleaning unit 130 can be suppressed.

Next, the second upper flow path F3 will be described. A second lower groove portion 161b is formed in the first extension wall 161 and a second upper groove 165b is formed in the second extension wall 165, in order to form the second upper flow path F3.

The second lower groove portion 161b is formed at a position adjacent to the second side cover 116 on the inner circumferential surface of the first extension wall 161, that is, a surface of the first extension wall 161 abutting against the rotation cleaning unit 130. The second lower groove portion 161b is different from the first lower groove portion 161a at the position where the second lower groove portion 161b is formed, and the remaining configurations are substantially the same.

The second upper groove portion 165b is formed at a position adjacent to the second side cover 116 on the inner circumferential surface of the second extension wall 165, that is, a surface of the second extension wall 165 abutting against the rotation cleaning unit 130. The second upper groove portion 165b is connected to the second lower groove portion 161b and the second upper flow path F3 is formed along the second lower groove portion 161b and the second upper groove portion 165b do. Meanwhile, in a case where the suction nozzle 100 does not include the second extension wall 165, the second upper flow path F3 may be formed only by the second lower groove portion 161b.

In addition, the second lower groove portion 161b and the second upper groove portion 165b may be formed to surround the rotation support portion 150. Accordingly, the second upper flow path F3 may be formed along the periphery of the rotation support portion 150, and the rotation support portion 150 may be cooled by the air flowing along the second upper flow path F3.

The width A of the second lower groove portion 161b and the second upper groove 165b in the left and right direction may be equal to each other as illustrated in the drawings, but the present invention is not limited thereto. The width A of the second lower groove portion 161b in the left and right direction and the width A of the second upper groove portion 165b in the left and right direction may be equal to the width A of the first lower groove portion 161a and the first upper groove portion 165a in the left-right direction. The separation distance between the inner circumferential surface of the chamber 112 and the upper side portion of the rotation cleaning unit 130 in the second upper flow path F3 can decrease toward the inside of the chamber 112 as in the first upper flow path F2. A detailed description thereof will be omitted. The division member 160 may further include a third extension wail 163 that couples with the first extension wall 161 and may be coupled to the back surface of the first extension wall 161 to support the first extension wall 161. A portion of the third extension wail 163 may be exposed to the first region 112a of the chamber 112 by forming the first lower groove portion 161a and the second lower groove portion 161b in the first extension wall 161.

As described above, the housing 110 is provided with a lower flow path F1 provided below the rotation cleaning unit 130 and a first upper flow path F2 provided on the upper side of the rotation cleaning unit 130 and thus the cooling of the drive unit can be performed efficiently, and the second upper flow path F3 is provided and thus the cooling of the rotation support portion 150 can be efficiently performed.

The connection pipe 120 can connect the housing 110 and the extension pipe 17 (see FIG. 1). In other words, one side of the connection pipe 120 is connected to the housing 110, and the other side of the connection pipe 120 is connected to the extension pipe The connection pipe 120 may be provided with a detachable button 122 for operating mechanical coupling with the extension pipe 17. The user can couple or uncouple the connection pipe 120 and the extension pipe 17 by operating the detachable button 122.

The connection pipe 120 may be rotatably connected to the housing 110. Specifically, the connection pipe 120 may be coupled to the first connection member 113a by a hinge so as to be vertically rotatable.

The housing 110 may be provided with connection members 113a and 113b for coupling the connection pipe 120 by a hinge. The connection members 113a and 113b may be formed to surround the inner pipe 1112. The connection members 113a and 113b may include a first connection member 113a and a second connection member 113b which are directly connected to the connection pipe 120. One side of the second connection member 113b may couple with the first connection member 113a and the other side of the second connection member 113b may couple with the main body portion 111.

As illustrated in FIG. 8, a hinge hole 114 is formed in the first connection member 113a, and a hinge shaft 124 inserted into the hinge hole 114 may be provided in the connection pipe 120. However, unlike the drawing, a hinge hole may be formed in the connection pipe 120 and a hinge shaft may be formed in the first connection member 113a. The hinge hole 114 and the hinge shaft 124 may collectively be referred to as "hinge unit".

The center 124a of the hinge shaft 124 may be disposed above the center axis C of the connection member 113a. Accordingly, the rotation center of the connection pipe 120 may be formed above the center axis C of the first connection member 113a.

The first connection member 113a may be rotatably connected to the second connection member 113b. Specifically, the first connection member 113a can rotate about a longitudinal axis thereof.

The suction nozzle 100 may further include an auxiliary hose 123 connecting the connection pipe 120 and the inner pipe 1112 of the housing 110. Accordingly, the air sucked into the housing 110 can move to the main body 10 (see FIG. 1) via the auxiliary hose 123, the connection pipe 120, and the extension pipe 17 (see FIG. 1).

The auxiliary hose 123 may be made of a flexible material so that the connection pipe 120 can be rotated. In addition, the first connection member 113a may be configured to surround at least a portion of the auxiliary hose 123 to protect the auxiliary hose 123.

The suction nozzle 100 may further include front wheels 117a and 117b for movement during cleaning. The front wheels 117a and 117b may be rotatably provided on the bottom surface of the housing 110. In addition, the front wheels 117a and 117b may be disposed on both sides of the front opening 111a, respectively and may be disposed behind the front opening 111a.

The suction nozzle 100 may further include a rear wheel 118. The rear wheel 118 may be rotatably provided on the bottom surface of the housing 110 and may be disposed behind the front wheels 117a and 117b.

The housing 110 may further include a support member 119 provided on the lower side of the main body portion 111. The support member 119 can support the main body portion 111. The front wheels 117a and 117b may be rotatably coupled to the support member 119.

The support member 119 may be provided with an extension portion 1192 extending backward. The rear wheel 118 may be rotatably coupled to the extension portion 1192. In addition, the extension portion 1192 can support the first connection member 113a and the second connection member 113b from the lower side thereof.

The rotation shaft 118a of the rear wheel 118 may be disposed behind the center 124a of the hinge shaft 124. Accordingly, since the stability of the housing 110 is improved, it is possible to prevent the housing 110 from being rolled over during cleaning.

Hereinafter, the detailed configuration of the drive unit 140 will be described.

Figure 12:
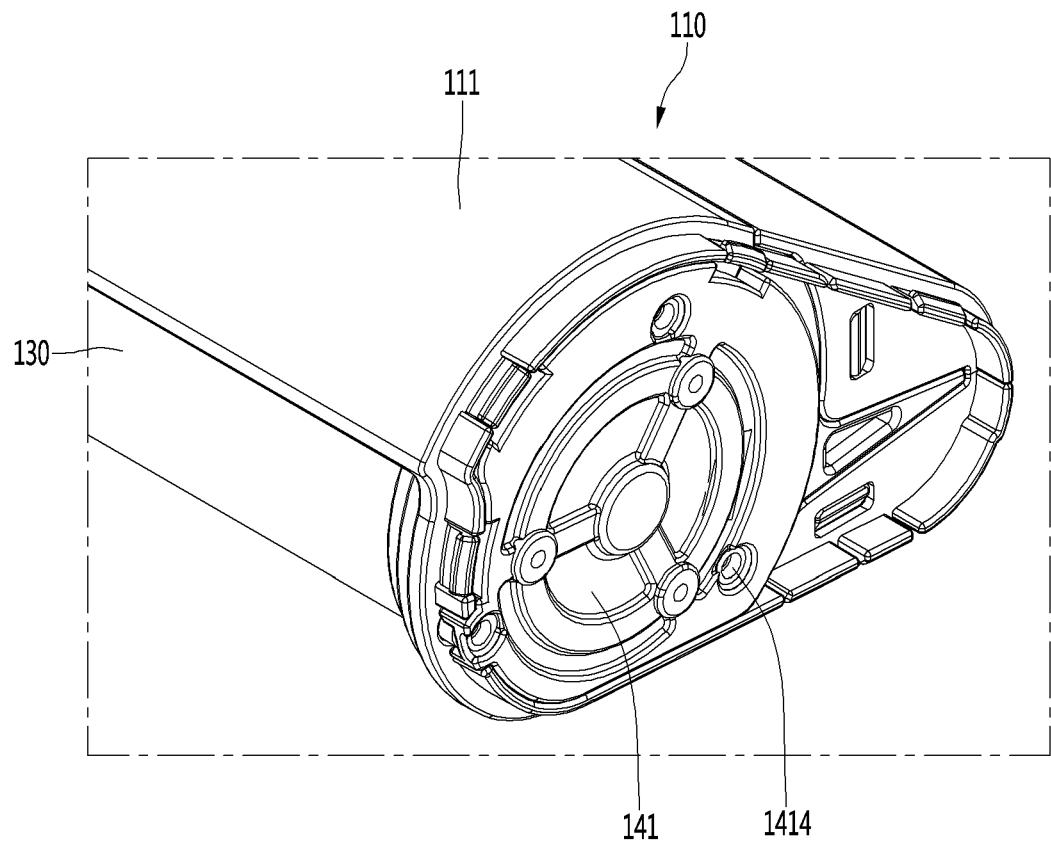
FIG. 12 is a view illustrating a state where a first side cover of the suction nozzle is removed.
Figure 13:
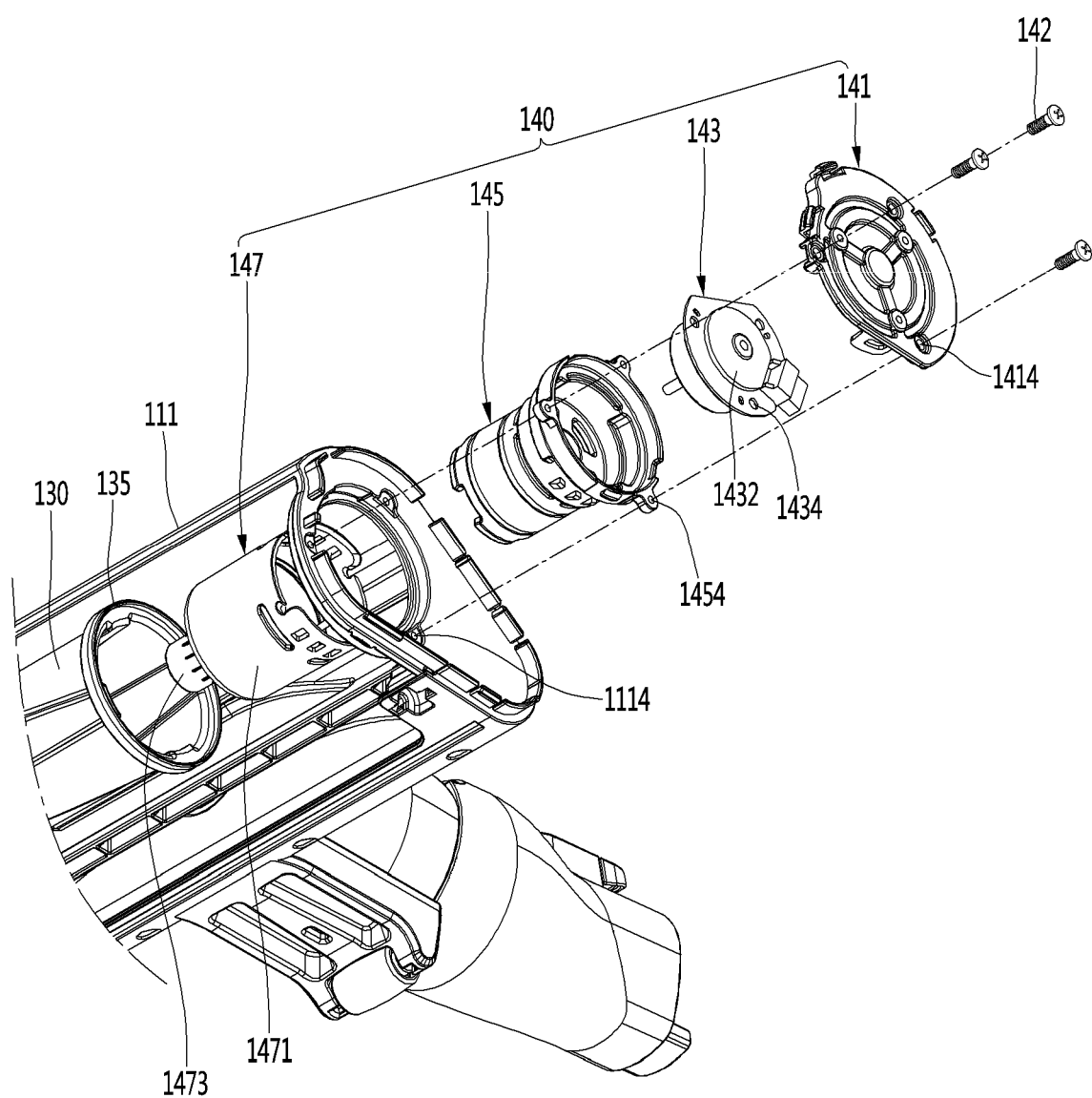
FIG. 13 is an exploded perspective view of a drive unit.
Figure 14:
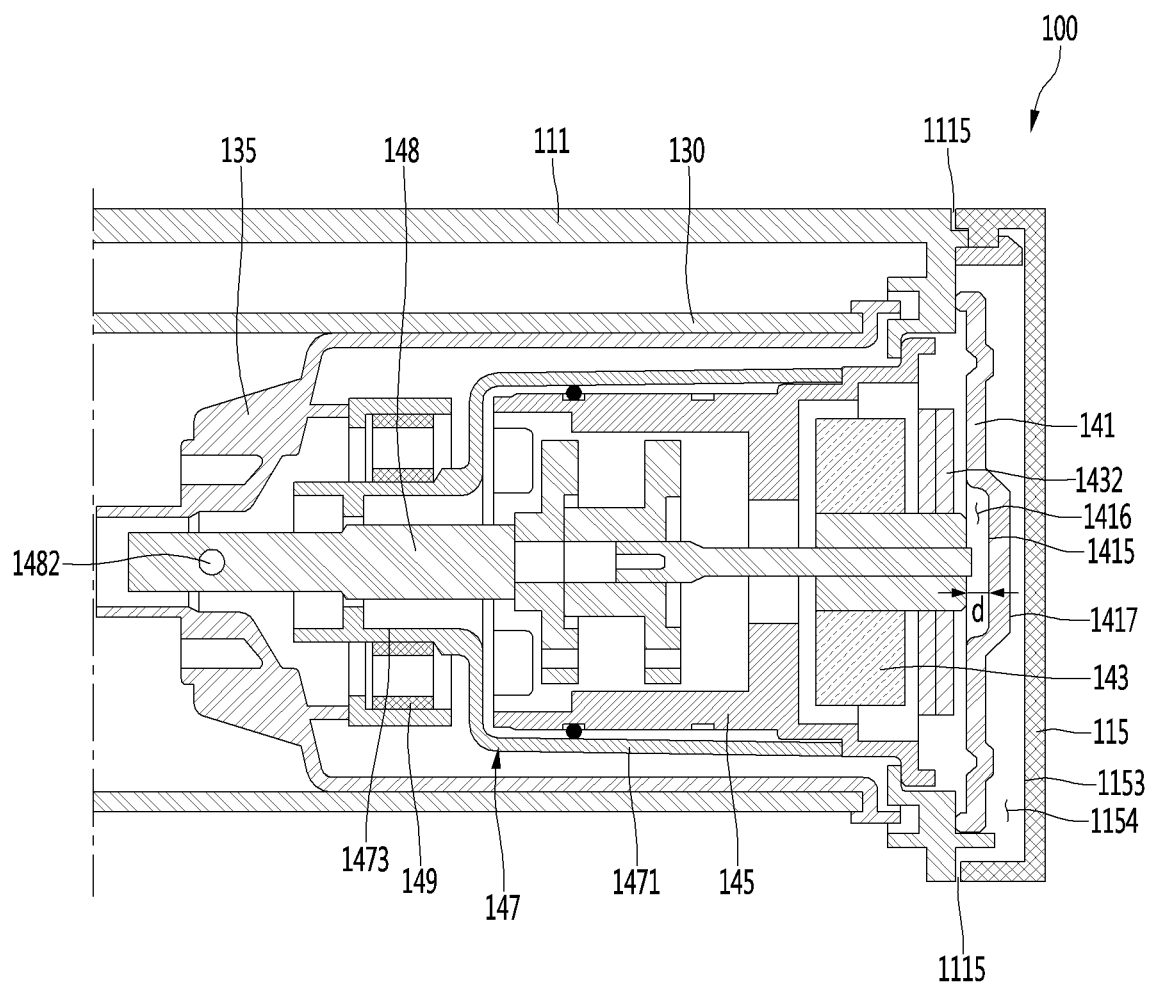
FIG. 14 is a cross-sectional view taken along the rotation axis of the rotation cleaning unit.

FIG. 12 is a view illustrating a state where the first side cover or the suction nozzle is removed, FIG. 13 is an exploded perspective view illustrating the drive unit, and FIG. 14 is a sectional view taken along the rotation axis of the rotation cleaning unit.

With reference to FIGS. 12 to 14, a drive unit 140 for rotating the rotation cleaning unit 130 is coupled to the main body portion 111 of the housing 110. The rotation cleaning unit 130 may include a coupling member 135 for coupling with the drive unit 140.

The coupling member 135 may be provided on one side of the rotation cleaning unit 130. At least a portion of the coupling member 135 may inserted into the rotation cleaning unit 130 and may be fixed to one end portion of the rotation cleaning unit 130.

At least a portion of the drive unit 140 may be inserted into one side of the rotation cleaning unit 130. Specifically, at least a portion of the drive unit 140 may be inserted into and fixed to the coupling member 135 and fixed. Therefore, a separate space for installing the drive unit 140 is not required.

The drive unit 140 includes a motor 143 for generating a driving force and a motor supporter 141. The motor 143 may include a BLDC motor.

A printed circuit board (PCB) installation portion 1432 on which a PCB for controlling the motor 143 is installed may be provided on one side of the motor 143. Although not illustrated, a PCB may be embedded in the PCB installation portion 1432 or may be attached to one side or the other side of the PCB installation portion 1432.

The motor 143 may be coupled to the motor supporter 141 by a fastening member such as a bolt. The motor 143 may be provided with a fastening hole 1434 for bolt fastening with the motor supporter 141.

The drive unit 140 may further include a gear unit 145 for transferring the power of the motor 143.

The motor 143 is coupled with the gear unit 145. The gear unit 145 may be formed with a hollow into which the motor 143 is inserted. The gear unit 145 may be bolted to the motor supporter and, to this end, a fastening hole 1454 may be formed at one side of the gear unit 1.

The motor 143 and the gear unit 145 may be fastened to the motor supporter 141. To this end, a fastening hole 1414 may be also formed in the motor supporter 141. A fastening hole 1414 provided in the motor supporter 141 is referred to as a first fastening hole 1414 and a fastening hole 1434 provided in the motor 143 referred to as second fastening hole 1434, and the fastening hole 1454 provided the gear unit 145 referred to as a third fastening hole 1454.

The fastening member 142 such as a bolt penetrates through the first fastening hole 1414, the second fastening hole 1434, and the third fastening hole 1454 in an assigned state, the motor supporter 141, the motor 143, and the gear unit 145 can be coupled to each other.

The main body portion 111 of the housing 110 may have a fastening hole 1114 to which the fastening member is coupled. According, the motor supporter 141, the motor 143, and the gear unit 145 can be fixed to the main body portion 111. In this way, the motor supporter 141, the motor 143, and the gear unit 145 are integrated with the main body portion. 111, thereby alleviating vibrations generated during operation of the motor 143.

The drive unit 140 may further include a cover member 147 surrounding the gear unit 145. The cover member 147 has a function of protecting the gear unit 145.

The drive unit 140 further includes a shaft 148 connected to the gear unit 145 and the shaft 148 is connected to the rotation cleaning unit 130. Specifically, the shaft 148 may be fixed to the coupling member 135.

To this end, the shaft 148 is provided with a fixing unit 1482 fixed to the coupling member 135 of the rotation cleaning unit 130. The shaft 148 is fixed to the coupling member 135 by the fixing unit 1482 and the rotation cleaning unit 130 can rotate together with the rotation of the shaft 148. Accordingly, the shaft 148 can transfer the driving force transferred from the motor 143 and the gear unit 145 to the rotation cleaning unit 130. The dive unit 140 may further include a bearing 149 installed on the cover member 147. The cover member 147 may include a main body 1471 surrounding the gear unit 145 and a tearing installation portion 1473 on which the bearing 149 is installed. As illustrated in the drawings, the bearing installation portion 1473 may be formed to have a smaller diameter than the main body 1471 of the cover member 147.

The bearing 149 may be disposed between the outer circumferential surface of the cover member 147 and the inner circumferential surface of the coupling member 135. Accordingly, the bearing 149 may fix the rotation cleaning unit 130 at a predetermined position and may support the self-load of the rotation cleaning unit 130 and the load applied to the rotation cleaning unit 130. Accordingly, the rotation cleaning unit 130 can rotate smoothly.

The motor supporter 141 may be made of a polycarbonate material. The polycarbonate material has high insulation and impact resistance. Therefore, the motor supporter 141 is strong against external impact and can prevent the static electricity generated by the friction between the suction nozzle 100 and the surface to be cleaned from being transferred to the motor 143.

A predetermined distance d is provided between the motor supporter 141 and the PCB installation portion 1432 of the motor 143. A space between the motor supporter 141 and the PCB installation portion 1432 may be referred to as a first space portion 1416.

The motor supporter 141 may be provided with a recessed portion 1415 for forming the first space portion 1416. The recessed portion 1415 may be recessed from the inner circumferential surface of the motor supporter 141 toward the outside.

Even in a case where the static electricity generated from the outside of the drive unit 140 is transferred to a side of the motor supporter 141 by the formation of the first space portion 1416, the static electricity does not reach the PCB installation portion 1432 of the motor 143 and can be discharged naturally. Accordingly, the PCB installed in the PCB installation portion 1432 of the motor 143 can be protected.

In addition, the outer circumferential surface 1417 of the motor supporter 141 is disposed to face the inner circumferential surface 1153 of the first side cover 115 and is spaced apart from the inner circumferential surface 1153 of the first side cover 115. The separation space between the motor supporter 141 and the first side cover 115 may be referred to as a second space portion 1154.

The formation of the second space portion 1154 can restrict a phenomenon that static electricity generated from the outside is transferred to the motor supporter 141 through the first side cover 115.

In other words, the PCB installation portion 1432 of the motor 143 may block the static electricity from being transferred by the first space portion 1416 and the second space portion 1154.

Meanwhile, a separation space 1115 may be formed between the main body portion 111 of the housing 110 and the first side cover 115 at a predetermined interval. External air for cooling the drive unit 140 may be introduced into the second space portion 1154 through the separation portion 1115. The introduced into the second space portion 1154 can flow outside the motor supporter 41.

Meanwhile, the motor supporter 141 may be spaced apart from the main body port on 111 of the housing 110 by a predetermined distance. Accordingly, the air in the second space portion 1154 can move to the first space portion 1416. In other words, the first space portion 1416 and the second space portion 1154 are respectively formed with a cooling flow path for cooling the drive unit 140. Accordingly, the respective components of the drive unit 140 such as the motor 143 and the gear unit 145 can be cooled.

As described above, the nozzle 100 of the cleaner of the present invention causes the static electricity generated by the friction with the surface to be cleaned to be naturally discharged by the first space portion 1416 and the second space portion 1154 and thus the PCB of the motor 143 can be prevented from being damaged by the static electricity. In addition, since the air flow path is formed in the first space portion 1416 and the second space portion 1154, the drive unit 140 can be effectively cooled.

The above description is merely illustrative of the technical idea of the present invention, and various modifications and changes may be made by those skilled in the art without departing from the essential characteristics of the present invention. Therefore, the embodiments disclosed in the present invention are not intended to limit but to describe the technical idea of the present invention, and the scope of the technical idea of the present invention not limited by these embodiments. The scope of protection of the present invention should be construed according to the following claims, and all technical ideas within the scope of equivalents thereof should be construed as being included in the scope of the present invention.

The invention claimed is:

1. A nozzle of a cleaner, the nozzle comprising:
   a housing comprising a main body portion and a side cover;
   a rotation cleaning unit accommodated in the housing and configured to perform a rotation operation to clean a surface; and
   a drive unit inserted into a first side of the rotation cleaning unit and configured to rotate the rotation cleaning unit,
   wherein the drive unit includes:
      a motor disposed on an inner surface of the side cover,
      a motor supporter disposed between the motor and the side cover and coupled to the motor,
      a gear unit connected to the motor and configured to transfer a driving force,
      a shaft connected to the gear unit and the rotation cleaning unit, the shaft being configured to transfer a rotation force from the gear unit to the rotation cleaning unit, and
      a printed circuit board (PCB) installation portion that faces the motor supporter and that is spaced apart from the motor supporter, and
   wherein the motor supporter defines:
      a first space portion provided between the motor supporter and the PCB installation portion and configured to guide air to flow between the motor supporter and the PCB installation portion, and
      a second space portion provided between the motor supporter and the side cover and configured to communicate the air with the first space portion.

2. The nozzle according to claim 1, wherein the motor supporter has a recessed portion that is recessed toward the side cover and that defines the first space portion.

3. The nozzle according to claim 1,
   wherein the rotation cleaning unit is accommodated in the main body portion, and the motor supporter is fixed to the main body portion, and wherein the side cover is coupled to the main body portion and covers at least a portion of the drive unit.

4. The nozzle according to claim 3, wherein the motor supporter defines a first fastening hole configured to receive a fastening member that couples the main body portion and the motor supporter to each other.

5. The nozzle according to claim 4, wherein the motor defines a second fastening hole that is aligned with the first fastening hole,
wherein the gear unit defines a third fastening hole that is aligned with the first and the second fastening holes, and
wherein the fastening member includes a bolt that is fixed to the main body portion and that passes through the first fastening hole, the second fastening hole, and the third fastening hole.

6. The nozzle according to claim 1, wherein at least a portion of the motor supporter is spaced apart from the main body portion of the housing.

7. The nozzle according to claim 6, wherein the housing includes a separation space that defines a predetermined distance between the main body portion and the side cover and that is configured to receive the air from an outside of the housing and to supply the air to the second space portion.

8. The nozzle according to claim 1, wherein the motor supporter is made of a polycarbonate material.

9. The nozzle according to claim 1, wherein the drive unit further includes a cover member that surrounds at least a portion of the gear unit and that is provided on an outer circumferential surface of the gear unit, the cover member being configured to block contaminants from entering into the motor.

10. The nozzle according to claim 9, wherein the cover member includes a bearing installation portion, and the drive unit further includes a bearing that is coupled to the bearing installation portion.

11. The nozzle according to claim 10, wherein the rotation cleaning unit includes a coupling member coupled to the shaft.

12. The nozzle according to claim 11, wherein the bearing is supported on an inner circumferential surface of the coupling member.

13. The nozzle according to claim 1, further comprising:
a rotation support portion that is inserted into a second side of the rotation cleaning unit and that supports the rotation cleaning unit, the second side being opposite to the first side.

14. The nozzle according to claim 1, wherein the motor supporter comprises:
an inner surface that faces the first side of the rotation cleaning unit and that is in contact with the first space portion; and
an outer surface that faces the side cover and that is in contact with the second space portion.

15. The nozzle according to claim 1, wherein the PCB installation portion, the first space portion, the motor supporter, and the second space portion are arranged along a rotation axis of the motor.

16. The nozzle according to claim 1, wherein the motor supporter divides a space between the main body portion and the side cover into the first space portion and the second space portion.

* * * * *